Jan. 6, 1959 C. I. EASTON ET AL 2,867,203
PRE-OILING DEVICE FOR ENGINES
Filed Aug. 6, 1956 2 Sheets-Sheet 1
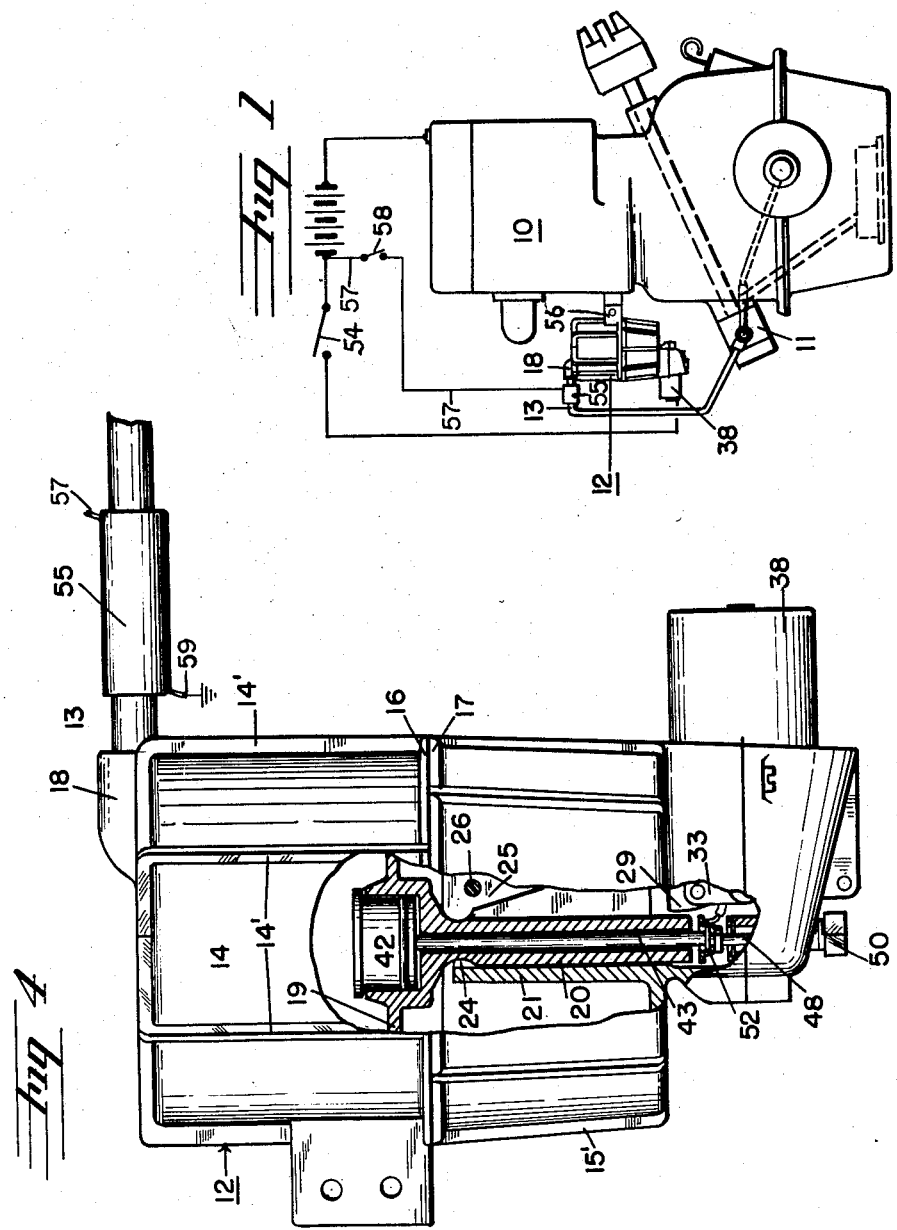
INVENTORS
CLARENCE I EASTON
JOSEPH R McCLELLAND
BY
F.R.Geisler
ATTORNEY

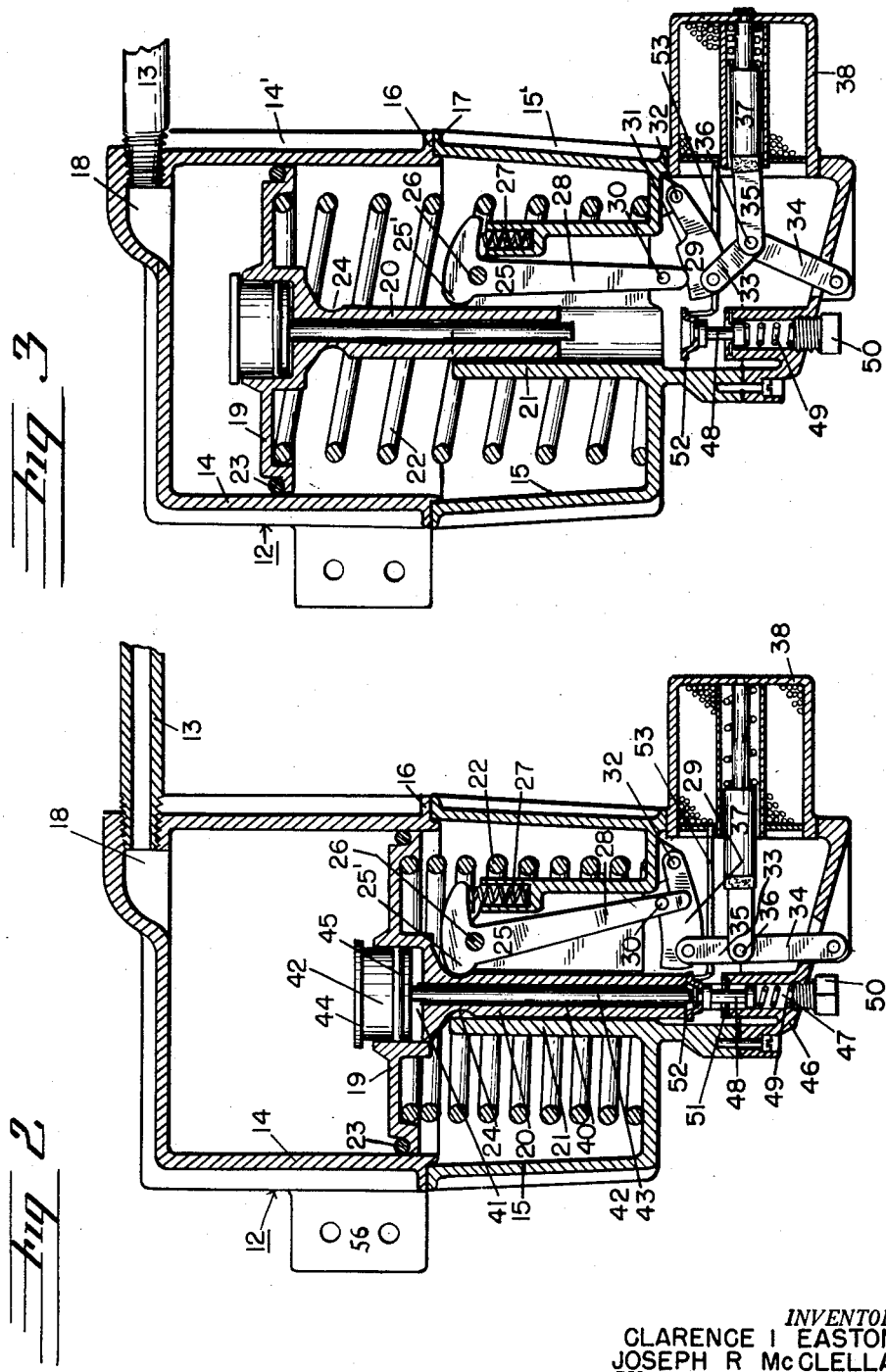

2,867,203

PRE-OILING DEVICE FOR ENGINES

Clarence I. Easton and Joseph R. McClelland, Portland, Oreg.

Application August 6, 1956, Serial No. 602,184

5 Claims. (Cl. 123—196)

This invention relates in general to lubricating systems for engines, such as the various types of internal combustion engines, and relates in particular to the lubrication systems for engines of automobiles, trucks, tractors, as well as for marine and aircraft engines.

It is customary, in the lubrication systems for such engines, to provide an oil pump operated from the engine, whereby the necessary lubricant is constantly delivered to the various bearing surfaces as long as the engine continues operating. However, with such arrangement, a certain amount of time is required each time the engine is started, before the resulting operation of the oil pump has been sufficient to cause delivery of the lubricant at all places where it is needed. It has been found that a considerable portion of the wear in such engines occurs during this interval at the starting of the engine until the necessary lubricant has extended to all places where it is immediately required. In the attempts to solve this difficulty and reduce such engine wear various means and devices have been contrived for providing initial lubrication temporarily until the normal lubrication through the action of the lubricant pump, as a result of the operation of the engine, has had time to become sufficiently effective. However, in spite of the recognized need for some pre-oiling means, the means and devices previously developed have not been extensively adopted. The reasons for this appear to be due to the fact that such devices developed heretofore for this purpose have been complicated and expensive to manufacture, or have been difficult to install on an ordinary engine, such as the engine in an automotive vehicle, or needed more space than was readily available adjacent the engine, or would require considerable care in their operation and maintenance.

An object of the present invention is to provide an improved and simplified pre-oiling device which can readily and easily be installed on any automobile engine or other internal combustion engine without necessitating any change or adjustment in any portion of the engine.

A related object of the invention is to provide an adequate pre-oiling device which will occupy a very small amount of space and which accordingly can be mounted adjacent the engine in any automotive vehicle without requiring any increase in the space beneath the customary hood placed over the engine in such vehicles.

Another object of the invention is to provide an improved pre-oiling device which will function as a part of the regular lubricating system without changing the normal operation of the system during the times in which the engine is operating.

A further object of the invention is to provide a pre-oiling device which not only will operate in conjunction with the regular lubricating system for the engine, but which, if so desired, will function entirely automatically.

An additional object of the invention is to provide an improved pre-oiling device for internal combustion engines which can be manufactured and sold within a moderate price range, and which, when once installed, will need only a minimum amount of care and attention in its maintenance.

The manner in which these objects and other incidental advantages are attained with the present invention, and the manner in which the pre-oiling device of this invention is constructed, as well as the manner in which it operates, will be readily understood from the following brief description with reference to the accompanying drawings.

In the drawings:

Figure 1 is a view, more or less diagrammatic, illustrating the pre-oiling device mounted for use with an automobile engine, which engine is assumed to have the customary lubrication system including a lubricant pump driven from the engine;

Figure 2 is an enlarged sectional elevation of the device by itself illustrating the position of the various members when the automobile engine and lubricant pump have ceased operating and the device is then in readiness for the pre-oiling of the engine whenever the engine is to be started;

Figure 3 is a corresponding sectional elevation illustrating the position of the members when such pre-oiling of the engine by the device is actually taking place; and Figure 4 is a corresponding elevation, with a portion of the outer wall broken away and the exposed parts shown in section, illustrating the position of the members after the engine and the lubricant pump have been in operation for a sufficient time to cause the lubricating system to be functioning normally.

In Figure 1 the automobile engine in general is indicated by the reference character 10 and it is assumed that this engine has the customary lubrication system which includes an oil pump indicated at 11, which is driven from the engine. The pre-oiling device, indicated in general by the reference character 12 is mounted on the engine by a bracket 56 (or may be mounted adjacent the engine on any suitable support), and a pipe or conduit 13 connects this pre-oiling device with the oil line from the pump and thus connects with the high side of the pump 11.

Referring now to Figures 2 and 3, the device includes a housing comprising an upper portion which forms a closed cylindrical chamber 14, and a lower portion 15. The two portions 14 and 15 have adjacent external annular flanges 16 and 17 by which the two sections are secured together, suitable screws or bolts (not shown) extending through registering holes in bosses formed in the flanges. Preferably, the walls of these two housing portions are formed with external ribs as indicated at 14' and 15' in order to provide extra strength without excessive weight to the entire device.

The upper portion or chamber 14 of the housing has a port 18 in the top which is provided with a threaded channel into which the threaded end of the pipe or conduit 13 fits. This pipe or conduit 13 connects with the oil line on the high side of the oil pump of the engine, as previously mentioned. This cylindrical upper portion or chamber 14 forms an oil pressure cylinder in which a piston 19 moves. The piston 19 has a stem 20 which slides up and down in a guideway 21 formed in the bottom portion 15 of the housing as shown. A strong compression coil spring 22, located in the bottom portion 15, bears against the underside of the piston 19 to urge it upwardly to the top of the upper portion or chamber 14. An O-ring 23 is mounted in a peripheral channel on the piston 19 and provides an oil seal between the inside cylindrical wall of the upper chamber 14 and the piston 19.

The stem 20 of the piston 19 has a rounded annular locking groove 24 near the top. This locking groove is so arranged as to be engaged by a holding latch 25 whenever the piston is in the low or fully retracted position shown in Figure 2. The holding latch 25 is formed with a rounded nose 25' corresponding in shape to the cross section of the annular groove 24 in the piston stem. The walls of the guideway 21 are extended on one side to provide a partial housing and mounting for the latch 25 and the latch is pivotally supported therein on a pin 26. A spring 27, engages an extension of the latch on the opposite side from the nose 25' and is so arranged as to urge the latch against the stem 20 of the piston 19 and into engagement with the groove 24 whenever the piston reaches the extreme low or retracted position. The latch 25 also has an elongated, downwardly extending arm 28, the lower end of which is bifurcated and which straddles a latch lock member 29 (or the latch may be formed of two parallel identical members spaced a fraction of an inch apart with the bottom ends of the respective arms extending on opposite sides of the lock member 29). A pin 30 extending across the bifurcated lower arm 28 (or between the two identical lower arms if the latch is formed of a pair of parallel members), is adapted to engage a notch 31 (Figure 3) of the straddled lock member 29. Whenever the latch 25 engages the groove 24 of the piston stem 20 and the latch lock member 29 is in the normal raised position of Figure 2, the latch will be secured in locking position and thus hold the piston 19 against any upward movement under the force of the spring 22.

The latch lock member 29, in turn, is pivotally mounted at one end on a pin 32 and is connected at the opposite end to the upper of a pair of toggle links 33 and 34. These toggle links 33 and 34 are pivotally connected to each other by the pin 36 and a control link 35 is also connected at one end to the pin 36 and at the other end to a spring mounted plunger 37 which operates in a solenoid 38.

The device as thus far described is so arranged as to be capable of operation in the following manner: When the oil pump of the engine lubricating system is in operation and the normal lubricant pressure has been established in the system, some of the lubricant will be delivered through the conduit 13 into the upper portion or chamber 14 of the pre-oiling device. The spring 22 beneath the piston 19 is so arranged that the force which it exerts on the piston 19 will be less than the opposing pressure exerted on the piston by the lubricant delivered into the chamber 14 under the oil pump pressure when the lubricating system of the engine is functioning normally. Consequently under such conditions the piston 19 will be pushed down to the maximum retracted position illustrated in Figure 2 and the piston stem 20 under such condition will be engaged by the latch 25, and the lock member 29 in turn will engage the pin 30 in the bottom of the latch arm 28. With these members so positioned, the piston 19 is held against any upward movement under the force of the spring 22 even though the operation of the engine and oil pump should cease and the pressure of the lubricant in the chamber 14 accordingly drop. However, if the solenoid 38 is momentarily energized when the pressure of the lubricant in the upper chamber 14 has dropped and the plunger 37 and link 35 are moved to the right (as viewed in Figures 2 and 3) by the solenoid, thus lowering the lock member 29 and disengaging the bottom end of the latch 25, the upward pressure of the spring 22 on piston 19 will be sufficient to cause the stem groove 24 to slide upwardly past the engaging nose of the latch 25. The piston will then be forced upwardly by spring pressure and will force the lubricant in chamber 14 out through conduit 13 and back into the engine lubricating system. Under such condition the chamber 14 becomes in effect a lubricant pressure cylinder with the piston 19 forcing the lubricant under pressure into the lubricating system of the engine, and this situation will prevail until the lubricant is exhausted from the chamber 14 or until such time as the operation of the oil pump has built up the lubricant pressure to the normal level in the lubricating system, whereupon lubricant will flow back into chamber 14 and push the piston 19 back down to fully retracted and locked position.

By connecting the solenoid 38 with the storage battery for the automobile engine through any simple manual switch, so that the closing of the switch would cause the solenoid to be energized to enable the piston 19 to be released, the pre-oiling operation could be caused to take place by the manual closing of the solenoid switch. Of course, under such arrangement the solenoid switch would be closed only at the start of the pre-oiling and would be kept open at all other times.

In the carrying out of the pre-oiling operation, however, we prefer to have the operation take place entirely automatically, when the device is mounted for use on an ordinary automobile engine, with the turning on of the customary ignition switch for the engine and to have the circuit to the solenoid automatically interrupted as soon as the desired pre-oiling has started. The preferred and special means by which such entirely automatic operation of the device is secured will now be described.

The stem 20 of the piston 19 is formed with a central channel 40 and a central well or cylindrical recess 41 is provided in the top of the piston 19 (Figure 2). A small supplementary piston 42 is mounted in this recess 41. This supplementary piston 42 has an integral stem 43 which extends down through the channel 40, is slidable in the channel, and is slightly longer than the channel and thus longer than the stem 20 of the main piston 19. The supplementary piston 42 has an enlarged top plate 44, which extends beyond the top rim of the recess 41, and the piston 42 carries an O-ring 45, set in a peripheral groove on the piston, to form an oil seal with the surrounding cylindrical wall of the recess 41.

A housing bracket 46, secured to the bottom of the lower main housing portion 15, is formed with a cylindrical channel 47 which is spaced below, but in axial alignment with the stems 20 and 43 of the main piston 19 and supplementary piston 42.

A contact carrier or plunger 48, of plastic or other suitable non-conducting material, is mounted in the channel 47 and is pressed upwardly by a coil spring 49 which is held in the channel 47 under compression between the bottom of the plunger 48 and an adjustable screw plug 50 which closes the bottom end of the channel 47. The bottom end of the plunger 48 has an annular shoulder which is adapted to engage a snap ring 51 in the top of the channel 47 when the plunger reaches its maximum raised position and prevents the plunger 48 from being pushed up entirely out of the channel 47.

A metal contact ring 52 is secured on the top of the non-conducting plunger 48 and is connected with the grounding terminal of the solenoid 38 by a conductor wire 53. This contact ring 52 is so arranged as to be engaged by the stem 20 of the main piston 19 under certain conditions and, when so engaged, completes the grounding of the solenoid 38 inasmuch as the main housing and piston 19 are grounded to the engine by the mounting bracket 56 as shown in Figure 1. However, when the supplementary piston 42 is in its lowest position, illustrated in Figure 4, the bottom end of the stem 43 of the supplementary piston engages the top of the plunger 48 and pushes the plunger downwardly a slight distance sufficient to prevent contact between the stem 20 of the main piston and the contact ring 52, and thus prevents the grounding of the solenoid circuit. The force exerted by the spring 49 against the plunger 48, and thus against the stem 43 and the supplementary piston 42, is so adjusted that the force will be less than the pressure which is exerted on the supplementary piston 42 by the lubricant in the chamber 14 when the engine and oil pump are operating at their lowest possible speed. However, when the engine and oil pump have ceased operating entirely, then the force of the spring 49 will be sufficient to thrust the plunger 48, stem 43 and supplementary piston 42 upwardly until the contact ring 52 engages the bottom of the grounded stem 20 of the main piston 19.

The automatic operation of the pre-oiling device can now be more fully described as follows: One terminal of the solenoid 38 is connected with the automobile battery through the customary ignition switch indicated at 54 in Figure 1, while the other terminal of the solenoid is arranged for being grounded through the contact ring 52. Before the engine is started the main piston 19 will be locked in the retracted or low position illustrated in Figure 2, as previously explained. The supplementary piston 42, however, will be in the relative slightly raised position of Figure 2 since the pressure of the lubricant in chamber 14 on the piston 42 will be less than the force exerted by the plunger spring 49. Consequently, the contact ring 52 will be in contact with the stem 20 of the main piston 19 and the solenoid 38 will be grounded. The closing of the ignition switch 54 (Figure 1) under these conditions will energize the solenoid, release the main piston 19 and start the pre-oiling operation. As soon as the main piston 19 is released and starts moving upwardly under the force of the spring 22, the grounding of the solenoid ceases and consequently the solenoid becomes inactive even though the ignition switch remains closed for the operation of the engine.

When the oil pump of the engine has succeeded in establishing normal lubricant pressure in the engine lubricating system and the main piston 19 has again been forced down to its lowest retracted position, the supplementary piston 42 will also be in its lowest position which is illustrated in Figure 4, and the contact ring 52 will continue to be kept separated from the stem 20 of the main piston 19 so that the grounding of the solenoid continues to be interrupted. However, when the operation of the engine and oil pump ceases, as a result of the turning off of the ignition switch 54, and the pressure of the lubricant in chamber 14 drops sufficiently as a result, the supplementary piston 42 will move upwardly slightly to the position of Figure 2, resulting in the grounding of the solenoid, but, since the ignition switch 54 is now open, the solenoid still remains inactive until the ignition switch is again closed preparatory to the starting of the engine.

Thus, the turning on of the ignition switch, when the engine is to be started, automatically activates the solenoid for a moment sufficient to release the piston 19 and start the pre-oiling operation. Then the solenoid 38 immediately becomes inactive and remains inactive until the next pre-oiling operation is to take place. In this way the pre-oiling of the engine is made to take place entirely automatically each time the ignition switch is turned on preparatory to starting the engine and the pre-oiling device becomes subsequently set for the next pre-oiling operation, without any attention whatsoever on the part of the operator.

In very cold weather it may become necessary, or at least desirable, to warm the lubricant in order to obtain satisfactory pre-oiling. For this purpose an electric heating element 55 (Figures 1 and 4) is added to the device. This heating element is illustrated as being mounted about the lubricant delivery pipe 13 although it could also be mounted on the wall of the chamber 14. Preferably this heating element 55 is connected to the automobile battery circuit by a separate manually operated switch 58 in the separate conductor wire 57 connected to the battery, since it may be desired to activate the heating element a few minutes in advance of the pre-oiling and subsequent starting of the engine, if the temperature of the weather is very low. The heating element is grounded separately as indicated at 59 in Figure 4.

While the pre-oiling device of the present invention has been described as being employed with an ordinary automobile engine, it will be understood that its manner of employment will be similar with any internal combustion engine which has an engine-driven oil pump as part of the lubrication system. Minor modifications in the structure of the pre-oiling device as described would of course be possible without departing from the principle of the invention or from the scope of the claims, but the structure as illustrated and described is considered to be the preferred means for the carrying out of the invention.

We claim:

1. In a pre-oiling device for an internal combustion engine having an electrical ignition circuit and a lubricating system with a lubricant pump operated by the engine, a housing mounted adjacent said engine, a lubricant pressure cylinder in said housing, a conduit joining said cylinder with said lubricating system, a piston movable in said cylinder, spring means connected with said piston for moving said piston so as to expel lubricant from said cylinder into said lubricating system, the force exerted by said spring being less than that exerted on said piston in the opposite direction by lubricant from said lubricating system when said pump is operating, spring actuated locking means automatically locking said piston in retracted position when lubricant from said lubricating system thrusts said piston into such retracted position, lock releasing means for releasing said piston to expel lubricant from said cylinder back into said lubricating system when the lubricant pressure is less than the force exerted by said spring on said piston, a solenoid operating said lock releasing means, a circuit for said solenoid, whereby the energizing of said solenoid will result in releasing said locking means, and means carried by said piston and responsive to the lubricant pressure in said cylinder for opening said circuit for said solenoid so as to prevent the energizing of said solenoid when said pump is in operation.

2. In a pre-oiling device of the character described for an engine having an electrical ignition circuit and a lubricating system with a lubricant pump operated by the engine, a lubricant pressure cylinder, a conduit joining said cylinder with said lubricating system, a piston movable in said cylinder, spring means connected with said piston for moving said piston so as to expel lubricant from said cylinder into said lubricating system, the force exerted by said spring means being less than that exerted on said piston in the opposite direction by lubricant from said lubricating system when said pump is operating, locking means automatically locking said piston in retracted position when lubricant from said lubricating system thrusts said piston into such retracted position, lock releasing means for releasing said piston to expel lubricant from said cylinder back into said lubricating system when the lubricant pressure is less than the force exerted by said means on said piston, a solenoid operating said lock releasing means, an ignition switch connecting a circuit for said solenoid with said ignition circuit, a separate contact also controlling said solenoid circuit, an element connected with said piston for contacting said contact and thereby closing said solenoid circuit when said piston is in retracted position, and means responsive to the pressure of lubricant in said cylinder preventing the closing of said solenoid circuit when the lubricant in said cylinder is subjected to pressure from said lubricant pump, whereby said solenoid can be energized only when said piston is in retracted position with said pump not operating and then only upon the closing of said ignition switch.

3. In a pre-oiling device of the character described for an engine having an electrical ignition circuit and a lubricating system with a lubricant pump operated by the engine, a housing, a portion of said housing constituting a lubricant pressure chamber, a conduit joining said chamber with said lubricating system, a main piston movable in said chamber, a spring connected with said piston for moving said piston so as to expel lubricant from said chamber into said lubricating system, the force exerted by said spring being less than that exerted on said piston in the opposite direction by lubricant from said lubricating system when said pump is operating, locking means locking said piston in retracted position when lubricant from said lubricating system thrusts said piston into such retracted position, lock releasing means for releasing said piston to expel lubricant from said chamber back into said lubricating system when the lubricant pressure is less than the force exerted by said spring on said piston, a solenoid operating said lock releasing means, an ignition switch connecting a circuit for said solenoid with said ignition circuit, a separate contact also controlling said solenoid circuit, an element connected with said piston for contacting said contact and thereby closing said solenoid circuit when said piston is in retracted position, and means responsive to the pressure of lubricant in said chamber preventing the closing of said solenoid circuit when the lubricant in said chamber is subjected to pressure from said lubricant pump, whereby said solenoid can be energized only when said main piston is in retracted position with said pump not operating and then only upon the closing of said ignition switch, said pressure responsive means including a supplementary piston engaged by the lubricant in said chamber and a separate spring moving said supplementary piston to inoperative position when said main piston is in retracted position and the lubricant in said chamber is not subjected to pressure from said pump.

4. A pre-oiling device for use in combination with an internal combustion engine having an electrical ignition circuit and a lubricating system with a lubricant pump operated by the engine, said device including a housing mounted adjacent said engine, a lubricant pressure cylinder in said housing, a conduit at the head of said cylinder joining said cylinder with said lubricating system, a main piston movable in said cylinder, a spring connected with said piston for moving said piston to the head of said cylinder so as to expel lubricant from said cylinder into said lubricating system, the force exerted by said spring being less than that exerted on said piston in the opposite direction by lubricant from said lubricating system when said pump is operating, spring actuated locking means automatically locking said piston in retracted position when lubricant from said lubricating system thrusts said piston into such retracted position, lock releasing means for releasing said piston to expel lubricant from said cylinder back into said lubricating system when the lubricant pressure is less than the force exerted by said spring on said piston, a solenoid operating said lock releasing means, a switch connecting a circuit for said solenoid with said ignition circuit, a separate contact also controlling said solenoid circuit, an element connected with said piston for contacting said contact and thereby closing said solenoid circuit when said piston is in retracted position, and means responsive to the pressure of lubricant in said cylinder preventing the closing of said solenoid circuit when the lubricant in said cylinder is subjected to pressure from said lubricant pump, said pressure responsive means including a smaller supplementary piston carried on said main piston and engaged by the lubricant in said cylinder and a separate spring moving said supplementary piston to inoperative position when said main piston is in retracted position and the lubricant in said cylinder is not subjected to pressure from said pump.

5. In a pre-oiling device of the character described for an engine having an electrical ignition circuit and a lubricating system with a lubricant pump operated by the engine, a lubricant pressure cylinder, a conduit joining said cylinder with said lubricating system, a piston movable in said cylinder, spring means connected with said piston for moving said piston so as to expel lubricant from said cylinder into said lubricating system, the force exerted by said spring means being less than that exerted on said piston in the opposite direction by lubricant from said lubricating system when said pump is operating, locking means automatically locking said piston in retracted position when lubricant from said lubricating system thrusts said piston into such retracted position, lock releasing means for releasing said piston to expel lubricant from said cylinder back into said lubricating system when the lubricant pressure is less than the force exerted by said spring means on said piston, a solenoid operating said lock releasing means, an ignition switch connecting a circuit for said solenoid with said ignition circuit, whereby the closing of said switch and the energizing of said solenoid will result in releasing said locking means, a separate contact also controlling said solenoid circuit, an element connected with said piston for contacting said contact and thereby closing said solenoid circuit when said piston is in retracted position, means responsive to the pressure of lubricant in said cylinder preventing the closing of said solenoid circuit when the lubricant in said cylinder is subjected to pressure from said lubricant pump, an electric heating element for heating the lubricant delivered from said cylinder into said lubricating system, and a separate switch connecting said heating element with the source of energy for said ignition circuit for controlling the actuation of said heating element.

References Cited in the file of this patent
UNITED STATES PATENTS

| | | |
|---|---|---|
| 2,225,539 | Persson | Dec. 17, 1940 |
| 2,755,787 | Butler | July 24, 1956 |

FOREIGN PATENTS

| | | |
|---|---|---|
| 570,477 | Great Britain | July 9, 1945 |